US006180030B1

(12) United States Patent
Hirai et al.

(10) Patent No.: US 6,180,030 B1
(45) Date of Patent: Jan. 30, 2001

(54) SUBSTRATE WITH TRANSPARENT CONDUCTIVE COATING AND DISPLAY DEVICE

(75) Inventors: Toshiharu Hirai; Michio Komatsu; Mitsuaki Kumazawa; Yuji Tawarazako, all of Kitakyushu (JP)

(73) Assignee: Catalysts & Chemicals Industries Co., Ltd. (JP)

( * ) Notice: Under 35 U.S.C. 154(b), the term of this patent shall be extended for 0 days.

(21) Appl. No.: 09/564,381

(22) Filed: Apr. 27, 2000

Related U.S. Application Data

(62) Division of application No. 08/937,937, filed on Sep. 25, 1997.

(30) Foreign Application Priority Data

Sep. 26, 1996 (JP) ... 8-255044
Oct. 24, 1996 (JP) ... 8-282671
Jun. 9, 1997 (JP) ... 9-151063

(51) Int. Cl.[7] ... H01B 1/02; H01J 29/06; B32B 5/30; B32B 15/16

(52) U.S. Cl. ... 252/512; 252/514; 313/473; 428/697; 428/918

(58) Field of Search ... 252/512, 513, 252/514, 518.1, 520.1, 520.3; 428/403, 325, 469, 422, 426, 688, 697, 918; 313/473

(56) References Cited

U.S. PATENT DOCUMENTS

| | | | |
|---|---|---|---|
| 5,334,409 | 8/1994 | Sohn et al. | 427/64 |
| 5,785,897 | 7/1998 | Toufuku et al. | 252/514 |
| 5,861,112 | 1/1999 | Watanabe et al. | 252/519.1 |

FOREIGN PATENT DOCUMENTS

| | | |
|---|---|---|
| 05198261 | 8/1993 | (JP) . |
| 05234538 | 9/1993 | (JP) . |
| 05325838 | 10/1993 | (JP) . |
| 06124666 | 5/1994 | (JP) . |
| 06279755 | 10/1994 | (JP) . |
| 07065751 | 3/1995 | (JP) . |
| 07262840 | 10/1995 | (JP) . |
| 07320663 | 10/1995 | (JP) . |
| 08020734 | 1/1996 | (JP) . |
| 08077832 | 3/1996 | (JP) . |

*Primary Examiner*—Mark Kopec
(74) *Attorney, Agent, or Firm*—Webb Ziesenheim Logsdon Orkin & Hanson, P.C.

(57) ABSTRACT

A coating liquid for forming a transparent conductive coating, comprising fine particles of a composite metal having an average particle size of 1 to 200 nm and a polar solvent. The above composite metal particles are preferably composed of an alloy of a plurality of metals or comprise fine metal particles or the fine alloy particles covered by a metal having a standard hydrogen electrode potential higher than that of the metal or alloy metal. A substrate with transparent conductive coating comprising a transparent conductive fine particle layer including the composite metal particles and a transparent coating disposed on the transparent conductive fine particle layer. A display device comprising a front panel composed of the above substrate with transparent conductive coating, the transparent conductive coating being formed at an outer surface of the front panel. The above coating liquid enables providing the transparent conductive coating which favorably has low surface resistivity and is excellent in antistatic, anti-reflection and electromagnetic shielding properties and also in reliability, and also enables providing the substrate clad with the transparent conductive coating and the display device having the above substrate.

12 Claims, No Drawings

SUBSTRATE WITH TRANSPARENT CONDUCTIVE COATING AND DISPLAY DEVICE

CROSS-REFERENCE TO RELATED APPLICATION

This application is a divisional of U.S. Ser. No. 08/937,937 filed Sep. 25, 1997.

FIELD OF THE INVENTION

The present invention relates to a coating liquid for forming a transparent conductive coating, a substrate with transparent conductive coating, a process for producing the same and a display device having a front panel composed of the substrate with transparent conductive coating. More particularly, the present invention is concerned with a coating liquid for forming a transparent conductive coating which is excellent in, for example, antistatic, electromagnetic shielding and anti-reflection properties, a substrate having such an excellent transparent conductive coating, a process for producing the same and a display device having a front panel composed of the above substrate with transparent conductive coating.

BACKGROUND OF THE INVENTION

It is common practice to form a transparent coating film having antistatic and anti-reflection capabilities on a surface of any of transparent substrates such as display panels of, for example, a cathode ray tube, a fluorescent character display tube and a liquid crystal display for the purpose of effecting the reductions of static electricity and reflection at such a surface.

Recently, attention has been drawn to the influence on human health of electromagnetic waves emitted from, for example, a cathode ray tube. Thus, it is desired to not only take the conventional antistatic and anti-reflection measures but also shield the above electromagnetic waves and the electromagnetic field produced by the emission of electromagnetic waves.

One method of shielding, for example, the above electromagnetic waves comprises forming a conductive coating film for shielding electromagnetic waves on a surface of a display panel of, for example, a cathode ray tube. However, although it is satisfactory for the conventional antistatic conductive coating films that the surface resistivity is at least about $10^7$ Ω/□, the conductive coating film for electromagnetic shielding must have a surface resistivity as low as $10^2$ to $10^4$ Ω/□

When it is intended to form the above conductive coating film of low surface resistivity with the use of the conventional coating liquid containing a conductive oxide such as Sb doped tin oxide or Sn doped indium oxide, the thickness thereof must inevitably be larger than that of the conventional antistatic coating film. However, the anti-reflection effect can be exerted only when the thickness of the conductive coating film is in the range of about 10 to 200 nm. Therefore, the use of the conventional conductive oxide such as Sb doped tin oxide or Sn doped indium oxide involves such the problem that it is difficult to obtain a conductive coating film which has low surface resistivity and is excellent in electromagnetic shielding and anti-reflection properties.

Another method of forming a conductive coating film of low surface resistivity comprises applying a coating liquid for forming a conductive coating film which contains fine particles of a metal such as Ag to thereby form a coating film containing the fine metal particles on a substrate surface. In this method, a dispersion of colloidal fine metal particles in a polar solvent is used as the coating liquid for formation of a coating film which contains fine metal particles. In this coating liquid, the surface of fine metal particles is treated with an organic stabilizer such as polyvinyl alcohol, polyvinylpyrrolidone or gelatin in order to improve the dispersibility of the colloidal fine metal particles. However, the conductive coating film formed from the above coating liquid for formation of a coating film which contains fine metal particles has a drawback in that fine metal particles contact each other through the organic stabilizer in the coating film to thereby tend to have large interparticulate resistance with the result that the surface resistivity of the coating film cannot be low. Thus, it is needed to conduct heating at temperatures as high as about 400° C. after the formation of the coating film to thereby decompose and remove the organic stabilizer. However, the heating at high temperatures for decomposition and removal of the organic stabilizer encounters the problem that fusion and aggregation of fine metal particles occur to thereby deteriorate the transparency and haze of the conductive coating film. Further, with respect to, for example, a cathode ray tube, the problem is encountered that quality deterioration is caused by exposure to high temperatures.

Moreover, the conventional transparent conductive coating film containing fine particles of a metal such as Ag involves the problem that the metal is oxidized, particulate growth is caused by ionization and occasionally corrosion occurs with the result that the conductivity and light transmittance of the coating film are deteriorated to thereby lower the reliability of the display device.

An object of the present invention is to resolve the above problems of the prior art and to provide a coating liquid for forming a transparent conductive coating which has surface resistivity as low as about $10^2$ to $10^4$ Ω/□. and is excellent not only in antistatic, anti-reflection and electromagnetic shielding properties but also in reliability, a substrate having such an excellent transparent conductive coating, a process for producing the same and a display device including the above substrate with transparent conductive coating.

SUMMARY OF THE INVENTION

The coating liquid for forming a transparent conductive coating according to the present invention comprises fine particles of a composite metal having an average particle size of 1 to 200 nm and a polar solvent.

In this coating liquid, it is preferred that the composite metal particles be composed of an alloy of a plurality of metals.

Further, it is preferred that the composite metal particles are fine metal particles or fine alloy particles covered by a metal having a standard hydrogen electrode potential higher than that of the metal or alloy metal which constitutes the fine metal particles or the fine alloy particles.

According to necessity, the above coating liquid for forming a transparent conductive coating may further comprise at least one member selected from among an organic stabilizer, conductive fine particles other than the composite metal particles and a matrix.

The substrate with transparent conductive coating of the present invention comprises:

a substrate, a transparent conductive fine particle layer including fine particles of a composite metal having an average particle size of 1 to 200 nm, the above layer being disposed on the substrate, and a transparent coating formed on the transparent conductive fine particle layer and having a refractive index lower than that of the transparent conductive fine particle layer.

In this substrate with transparent conductive coating, it is preferred that the composite metal particles be composed of an alloy of a plurality of metals. Also, it is preferred that the composite metal particles comprise fine metal particles or fine alloy particles covered by a metal having a standard hydrogen electrode potential higher than that of the metal or alloy metal.

The first process for producing a substrate with transparent conductive coating according to the present invention comprises the steps of:

applying onto a substrate a coating liquid for forming a transparent conductive coating, comprising fine particles of a composite metal having an average particle size of 1 to 200 nm and a polar solvent, drying to thereby form a transparent conductive fine particle layer, and applying a coating liquid for forming a transparent coating onto the fine particle layer to thereby form a transparent coating having a refractive index lower than that of the transparent conductive fine particle layer on the fine particle layer.

When the coating liquid for forming a transparent conductive coating contains an organic stabilizer, it is preferred that the coating liquid for forming a transparent coating contain an acid.

In this process, the composite metal particles contained in the coating liquid for forming a transparent conductive coating may be formed by adding into a dispersant comprising fine metal particles or fine alloy particles and a polar solvent, a salt of metal having a standard hydrogen electrode potential higher than that of the metal or alloy which constitutes the fine metal particles or the fine alloy particles, thereby the metal having a standard hydrogen electrode potential higher than that of the metal or alloy which constitutes the fine metal particles or the fine alloy particles being deposited on the fine metal particles or the fine alloy particles.

The second process for producing a substrate with transparent conductive coating according to the present invention comprises the steps of:

applying onto a substrate a coating liquid for forming a transparent conductive coating, comprising fine metal particles or fine alloy particles and a polar solvent, drying to thereby form a transparent conductive fine particle layer, and applying a coating liquid for forming a transparent coating, the above coating liquid containing ions of a metal having a standard hydrogen electrode potential higher than that of the metal or alloy which constitutes the fine metal particles or the fine alloy particles, onto the transparent conductive fine particle layer to thereby not only form a transparent coating having a refractive index lower than that of the fine particle layer on the fine particle layer but also cause the metal having a standard hydrogen electrode potential higher than that of the metal or alloy which constitutes the fine metal particles or the fine alloy particles to precipitate on the fine metal particles or the fine alloy particles contained in the fine particle layer so that the fine metal particles or the fine alloy particles are converted to fine composite metal particles.

When the coating liquid for forming a transparent conductive coating contains an organic stabilizer, it is preferred that the coating liquid for forming a transparent coating contain an acid.

The third process for producing a substrate with transparent conductive coating according to the present invention comprises the steps of:

applying onto a substrate a coating liquid for forming a transparent conductive coating, comprising fine metal particles, a polar solvent and an organic stabilizer, drying to thereby form a transparent conductive fine particle layer, applying a coating liquid for forming a transparent coating containing an acid, onto the transparent conductive fine particle layer to thereby form a transparent coating having a refractive index lower than that of the fine particle layer on the fine particle layer, decomposing the organic stabilizer, and heating.

The display device of the present invention comprises a front panel composed of the above substrate with transparent conductive coating, the transparent conductive coating being formed at an outer surface of the front panel.

DETAILED DESCRIPTION OF THE INVENTION

The present invention will now be described in detail.

Coating Liquid for Forming a Transparent Conductive Coating

The coating liquid for forming a transparent conductive coating according to the present invention will first be described below.

The coating liquid for forming a transparent conductive coating according to the present invention comprises fine particles of a composite metal having an average particle size of 1 to 200 nm and a polar solvent.

[Fine Particles of Composite Metal]

The terminology "fine particles of a composite metal" used herein means fine particles composed of at least two kinds of metals.

At least two kinds of metals constituting the composite metal particles may be in the form of any of an alloy in a state of solid solution, an eutectic not in a state of solid solution and a combination of an alloy and an eutectic. In these composite metal particles, the metal oxidation and ionization are inhibited, so that, for example, the particulate growth of composite metal particles is inhibited. Thus, the reliability of the composite metal particles is high in that, for example, their corrosion resistance is high and the deterioration of their conductivity and light transmittance is slight.

Examples of such composite metal particles include those composed of at least two kinds of metals selected from among metals such as Au, Ag, Pd, Pt, Rh, Ru, Cu, Fe, Ni, Co, Sn, Ti, In, Al, Ta and Sb. Preferred combinations of at least two types of metals include, for example, Au-Cu, Ag-Pt, Ag-Pd, Au-Pd, Au-Rh, Pt-Pd, Pt-Rh, Fe-Ni, Ni-Pd, Fe-Co, Cu-Co, Ru-Ag, Au-Cu-Ag, Ag-Cu-Pt, Ag-Cu-Pd, Ag-Au-Pd, Au-Rh-Pd, Ag-Pt-Pd, Ag-Pt-Rh, Fe-Ni-Pd, Fe-Co-Pd and Cu-Co-Pd.

In the present invention, it is preferred that the composite metal particles be composed of an alloy of a plurality of metals. Also, it is preferred that the composite metal particles comprise fine metal particles or fine alloy particles covered by a metal having a standard hydrogen electrode potential higher than that of the metal or alloy metal.

These composite metal particles can be produced by the following conventional processes.

(i) One process comprises simultaneously or separately reducing a plurality of metal salts in a mixed solvent of an alcohol and water. In this process, a reducing agent may be added according to necessity. Examples of suitable reducing agents include ferrous sulfate, trisodium citrate, tartaric acid, sodium borohydride and sodium hypophosphite. Heat treatment may be conducted in a pressure vessel at about 100° C. or higher.

(ii) The other process comprises providing a dispersion of fine metal particles or fine alloy particles and causing fine particles or ions of a metal having a standard hydrogen electrode potential higher than the fine metal particles or the fine alloy particles to be present in the dispersion to thereby precipitate the metal of higher standard hydrogen electrode potential on the fine metal particles and/or the fine alloy particles. Further, a metal of higher standard hydrogen electrode potential may be deposited on the thus obtained composite metal particles.

The difference of standard hydrogen electrode potential between individual metals composing the above composite metal particles (when using at least three metals, difference between the maximum standard hydrogen electrode potential and the minimum standard hydrogen electrode potential) is preferably at least 0.05 eV and still preferably at least 0.1 eV. The metal exhibiting the maximum standard hydrogen electrode potential is preferably present in the composite metal particles in a weight ratio (metal exhibiting the maximum standard hydrogen electrode potential/composite metal) ranging from 0.05 to 0.95. When this weight ratio is less than 0.05 or exceeds 0.95, it may occur that the oxidation and ionization inhibiting effect of the composite metal is too slight to contribute toward a reliability enhancement.

It is preferred that the above metal exhibiting the maximum standard hydrogen electrode potential be abundant in the surface layer of the composite metal particles. The presence in abundance of the metal exhibiting the maximum standard hydrogen electrode potential in the surface layer of the composite metal particles inhibits the oxidation and ionization of the composite metal particles to thereby enable suppressing the particulate growth attributed to, for example, ion migration. Further, these composite metal particles have high corrosion resistance, so that the deterioration of conductivity and light transmittance can be suppressed.

The average particle size of these composite metal particles preferably ranges from 1 to 200 nm, still preferably, 2 to 70 nm. When the average particle size of the composite metal particles exceeds 200 nm, the absorption of light by the metal becomes large to thereby not only lower the light transmittance of the particle layer but also increase the haze thereof. Therefore, when the substrate with the coating containing such particles is used as, for example, a front panel of a cathode ray tube, it may occur that the resolution of the display image is deteriorated. On the other hand, when the average particle size of the composite metal particles is less than I nm, the particle layer suffers from a sharp increase of surface resistivity, so that it may occur that a coating having a resistivity value as low as capable of attaining the object of the present invention cannot be obtained.

[Polar Solvent]

The polar solvent for use in the present invention is, for example, any of water; alcohols such as methanol, ethanol, propanol, butanol, diacetone alcohol, furfuryl alcohol, tetrahydrofurfuryl alcohol, ethylene glycol and hexylene glycol; esters such as methyl acetate and ethyl acetate; ethers such as diethyl ether, ethylene glycol monomethyl ether, ethylene glycol monoethyl ether, ethylene glycol monobutyl ether, diethylene glycol monomethyl ether and diethylene glycol monoethyl ether; and ketones such as acetone, methyl ethyl ketone, acetylacetone and acetoacetic esters. These may be used either individually or in combination.

This coating liquid for forming a transparent conductive coating may contain conductive fine particles other than the above composite metal particles.

Examples of suitable conductive fine particles other than the composite metal particles include commonly employed transparent conductive particulate inorganic oxides and particulate carbon.

The above transparent conductive particulate inorganic oxides include, for example, tin oxide, tin oxide doped with Sb, F or P, indium oxide, indium oxide doped with Sn or F, antimony oxide and low-order titanium oxide.

The average particle size of the above conductive fine particles preferably ranges from 1 to 200 nm, still preferably, from 2 to 150 nm.

The above conductive fine particles are preferably contained in the coating liquid in an amount of not greater than 4 parts by weight per part by weight of the composite metal particles. When the amount of the conductive fine particles exceeds 4 parts by weight, it may unfavorably occur that a conductivity lowering results to thereby cause a deterioration of electromagnetic shielding effect.

The incorporation of the above conductive fine particles enables formation of a transparent conductive fine particle layer having enhanced transparency. Moreover, the incorporation of the above conductive fine particles enables producing the substrate with transparent conductive coating at lowered cost.

The coating liquid for forming transparent conductive coating according to the present invention may contain a matrix component which acts as a binder of conductive fine particles after the formation of the coating. This matrix component is preferably composed of silica and is, for example, any of hydrolytic polycondensates from organosilicon compounds such as alkoxysilanes, silicic acid polycondensates obtained by dealkalizing aqueous solutions of alkali metal silicates and coating resins. This matrix may be contained in the coating liquid in an amount of 0.01 to 0.5 part by weight, preferably, 0.03 to 0.3 part by weight per part by weight of the composite metal particles.

An organic stabilizer may be contained in the coating liquid for forming a transparent conductive coating in order to improve the dispersion performance of the composite metal particles. Examples of suitable organic stabilizers include gelatin, polyvinyl alcohol, polyvinylpyrrolidone, oxalic acid, malonic acid, succinic acid, glutaric acid, adipic acid, sebacic acid, maleic acid, fumaric acid, phthalic acid, citric acid and other polybasic carboxylic acids and salts thereof, heterocyclic compounds and mixtures of the above compounds.

This organic stabilizer may be contained in the coating liquid in an amount of 0.005 to 0.5 part by weight, preferably, 0.01 to 0.2 part by weight per part by weight of the composite metal particles. When the amount of the organic stabilizer is less than 0.005 part by weight, desirable dispersion performance cannot be realized. On the other hand, when the amount of the organic stabilizer is larger than 0.5 part by weight, a conductivity deterioration may result.

Substrate with Transparent Conductive Coating

The substrate with transparent conductive coating of the present invention will be described in detail below.

In the substrate with transparent conductive coating of the present invention, a transparent conductive fine particle layer including fine particles of a composite metal having an average particle size of 1 to 200 nm, preferably, 2 to 70 nm is disposed on a substrate such as a film, sheet or other molding made of glass, plastic, ceramic or other material.

The composite metal particles are the same as described above.

[Transparent Conductive Fine Particle Layer]

The thickness of the transparent conductive fine particle layer is preferably in the range of about 5 to 200 nm, still preferably, 10 to 150 nm. When the transparent conductive fine particle layer has a thickness falling within the above range, a substrate with transparent conductive coating having excellent electromagnetic shielding effect can be obtained therefrom.

According to necessity, this transparent conductive fine particle layer may further comprise at least one member selected from among conductive fine particles other than the composite metal particles, a matrix and an organic stabilizer. Examples thereof are as described above.

[Transparent Coating]

In the substrate with transparent conductive coating of the present invention, a transparent coating having a refractive index lower than that of the above transparent conductive fine particle layer is formed on the transparent conductive fine particle layer.

The thickness of the formed transparent coating is preferably in the range of about 50 to 300 nm, still preferably, 80 to 200 nm.

This transparent coating is formed from any of inorganic oxides such as silica, titania and zirconia or a compound oxide thereof. In the present invention, especially, a silica based coating composed of any of hydrolytic polycondensates from hydrolyzable organosilicon compounds and silicic acid polycondensates obtained by dealkalizing aqueous solutions of alkali metal silicates is preferably used as the above coating. The substrate with transparent conductive coating provided with this transparent coating exhibits excellent anti-reflection performance.

The above transparent coating film may contain additives such as fine particles of low refractive index composed of magnesium fluoride and other materials, dyes and pigments according to necessity.

Process for Producina Substrate with Transparent Conductive Coating

The process for producing a substrate with transparent conductive coating according to the present invention will be illustrated below.

First Process for Producing Substrate with Transparent Conductive Coating

The first process for producing a substrate with transparent conductive coating according to the present invention comprises the steps of:

- applying onto a substrate a coating liquid for forming a transparent conductive coating, comprising fine particles of a composite metal having an average particle size of 1 to 200 nm and a polar solvent,
- drying to thereby form a transparent conductive fine particle layer, and
- applying a coating liquid for forming a transparent coating onto the fine particle layer to thereby form a transparent coating having a refractive index lower than that of the fine particle layer on the fine particle layer.

[Coating Liquid for Forming Transparent Conductive Coating]

The coating liquid for forming transparent conductive coating for use in the first process of the present invention comprises fine particles of a composite metal and a polar solvent.

Those as described hereinbefore can be used as the above composite metal particles of the coating liquid for forming transparent conductive coating. These composite metal particles may be formed by adding to a dispersion comprising fine metal particles or fine alloy particles and a polar solvent a salt of metal having a standard hydrogen electrode potential higher than that of the fine particles (metal or alloy) constituting metal or alloy metal during the preparation of the coating liquid for forming transparent conductive coating to thereby cause the metal having a standard hydrogen electrode potential higher than that of the fine particles constituting metal or alloy metal to precipitate on the fine metal particles or the fine alloy particles. Fine metal particles employed in this formation can be composed of a member selected from among metals such as Au, Ag, Pd, Pt, Rh, Cu, Fe, Ni, Co, Sn, Ti, In, Al, Ta, Sb and Ru. The fine alloy particles may be composed of a combination of at least two members selected from among these metals. It is preferred that these fine metal or alloy particles have a particle size of 1 to 200 nm, especially, 2 to 70 nm. Moreover, the fine composite metal particles may be formed by adding to the obtained dispersion of composite metal particles a salt of metal having a standard hydrogen electrode potential higher than that of the metals constituting composite metal particles to thereby cause the metal having a standard hydrogen electrode potential higher than that of the metals constituting composite metal particles to precipitate on the composite metal particles.

Any of the same polar solvents as mentioned hereinbefore can be used in the coating liquid for forming transparent conductive coating.

The difference between the standard hydrogen electrode potential of the precipitated metal and that of the metal constituting fine metal or alloy particles is preferably at least 0.05 eV, still preferably, at least 0.1 eV. The metal to be precipitated is generally added in the form of sulfate, a nitrate, a hydrochloric acid salt, an organic cid salt or the like. It is preferred that metal ions be added to the dispersion in an amount of 0.05 to 19 parts by weight, especially, 0.1 to 0.9 part by weight, in terms of metal, per part by weight of fine metal or alloy particles.

In the present invention, the fine composite metal particles are preferably contained in the employed coating liquid for forming transparent conductive coating in a concentration of 0.05 to 5% by weight, still preferably, 0.1 to 2% by weight.

This coating liquid for forming transparent conductive coating may be doped with conductive fine particles other than the above composite metal particles. The same conductive fine particles as mentioned hereinbefore can be used in the coating liquid for forming transparent conductive coating. These conductive fine particles may be contained in the coating liquid in an amount of not greater than 4 parts by weight per part by weight of the composite metal particles.

Further, the coating liquid for forming transparent conductive coating may be doped with, for example, a dye and a pigment so that the transmittance of light through the coating becomes constant over a broad wavelength zone of visible radiation.

The solid content (total amount of composite metal particles and additives such as optionally added conductive fine particles other than the composite metal particles, dye and pigment) of the coating liquid for forming transparent conductive coating for use in the present invention is preferably not greater than 15% by weight, till preferably, in the range of 0.15 to 5% by weight, taking into account, for example, the flowability of the coating liquid and the dispersion of granular components such as composite metal particles contained in the coating liquid. The above coating liquid for forming transparent conductive coating may contain a matrix component which acts as a binder after the formation of the coating film.

Although conventional matrix materials can be used as the matrix component, it is preferred in the present invention that use be made of a silica based matrix component.

Examples of suitable silica based matrix components include hydrolytic polycondensates from organosilicon compounds such as alkoxysilanes, silicic acid polycondensates obtained by dealkalizing aqueous solutions of alkali metal silicates and coating resins.

This matrix component is preferably contained in the coating liquid for forming transparent conductive coating in an amount of 0.01 to 2% by weight, still preferably, 0.1 to 1% by weight per part by weight of the composite metal particles.

Still further, the above-mentioned organic stabilizer may be contained in the coating liquid for forming transparent conductive coating in order to improve the dispersion performance of the composite metal particles.

Although the amount of added organic stabilizer depends on, for example, the type of the organic stabilizer and the particle size of composite metal particles, the organic stabilizer may be contained in the coating liquid in an amount of 0.005 to 0.5 part by weight, preferably, 0.01 to 0.2 part by weight per part by weight of the composite metal particles. When the amount of the organic stabilizer is less than 0.005 part by weight, desirable dispersion performance cannot be realized. On the other hand, when the amount of the organic stabilizer is larger than 0.5 part by weight, a conductivity deterioration may result.

Moreover, it is preferred that the total of concentrations of alkali metal ions, ammonium ion, polyvalent metal ions, inorganic anions such as mineral acid anions and organic anions such as acetic acid and formic acid anions which are present in the coating liquid for forming transparent conductive coating for use in the present invention and which are liberated from the particles be not greater than 10 mmol per 100 g of all solid contents contained in the coating liquid. In particular, inorganic anions such as mineral acid anions are detrimental to the stability and dispersion of composite metal particles, so that the lower the concentration thereof is desirable. When the ion concentration is low, the dispersion condition of the particulate components, especially, conductive fine particles contained in the coating liquid for forming transparent conductive coating is excellent, and a coating liquid in which substantially no aggregated particles are resent can be obtained. A monodisperse condition of the articulate components in this coating liquid is maintained during the step of forming the transparent conductive fine particle layer. Therefore, no aggregated particles are observed in the transparent conductive fine particle layer formed from the coating liquid for forming transparent conductive coating having the above low ion concentration.

The conductive fine particles such as the composite metal particles can be uniformly dispersed and aligned in the transparent conductive fine particle layer formed from the above coating liquid of low ion concentration, so that the transparent conductive fine particle layer can have equivalent conductivity with the use of a smaller amount of conductive fine particles than in a transparent conductive fine particle layer in which conductive fine particles are aggregated with each other. Further, hence, a transparent conductive fine particle layer which is free of point defect and uneven film thickness attributable to mutual aggregation of particulate components can be formed on a substrate.

The method for deionization for obtaining the above coating liquid of low ion concentration is not particularly limited as long as, finally, the ion concentration of the coating liquid falls within the above range. However, as preferred deionization methods, there can be mentioned one in which either a dispersion of particulate components as a feedstock for the coating liquid or a coating liquid produced from the dispersion is contacted with a cation exchange resin and/or anion exchange resin, and another in which the above dispersion or liquid is cleaned with an ultrafilter membrane.

[Formation of Transparent Conductive Fine Particle Layer]

In the first process of the present invention, the above coating liquid for forming transparent conductive coating is applied onto a substrate and dried to thereby form the transparent conductive fine particle layer on the substrate.

The formation of the transparent conductive fine particle layer can be accomplished by, for example, a method in which the coating liquid for forming transparent conductive coating is applied onto the substrate by dipping, spinner, spray, roll coater, flexographic printing and other techniques and dried at room temperature to 90° C.

When the coating liquid for forming transparent conductive coating contains the above matrix forming component, the matrix forming component may be cured by any of the following curing methods.

(a) Curing by Heating:

The dried coating film is heated to thereby cure the matrix component. The heating temperature is preferably at least 100° C. and, still preferably, ranges from 150 to 300° C. When the heating temperature is below 100° C., it may occur that the curing of the matrix forming component is unsatisfactory. The upper limit of the heating temperature may vary depending on the type of the substrate as long as it is not higher than the transition temperature of the substrate.

(b) Curing by Electromagnetic Wave:

The matrix component is cured by irradiating the coating film with an electromagnetic wave having a wave-length smaller than that of visible radiation after the above application or drying step, or during the drying step. Examples of electromagnetic waves applied for promoting the curing of the matrix forming component include ultraviolet radiation, electron beam, X-rays and gamma-rays, from which an appropriate selection is made depending on the type of the matrix forming component. For example, the coating film is irradiated with an ultraviolet radiation with an energy density of 100 $mJ/cm^2$ or greater emitted from a high-pressure mercury lamp, as an ultraviolet radiation source, having luminous intensity maximums at about 250 nm and 360 nm and having a light intensity of 10 $mW/cm^2$ or higher.

(c) Gas Curing:

The matrix forming component is cured by exposing the coating to an atmosphere of a gas capable of promoting the curing reaction of the matrix forming component after the above application or drying step, or during the drying step. The varieties of matrix forming component include one whose curing is promoted by an active gas such as ammonia. Treating the transparent conductive fine particle layer containing this matrix forming component with a curing promoting gas atmosphere of 100 to 100,000 ppm, preferably, 1000 to 10,000 ppm in gas concentration for 1 to 60 min enables markedly promoting the curing of the matrix forming component.

The thickness of the transparent conductive fine particle layer formed by the above procedure preferably ranges from about 50 to 200 nm. When the thickness falls within this range, the obtained substrate with transparent conductive coating can exert excellent electromagnetic shielding effect.

[Formation of transparent coating]

In the present invention, the transparent coating having a refractive index lower than that of the above formed transparent conductive fine particle layer is formed on the transparent conductive fine particle layer.

The thickness of the transparent coating preferably ranges from 50 to 300 nm, still preferably, 80 to 200 nm. When the thickness falls within this range, the transparent coating exhibits excellent anti-reflection properties.

The method of forming the transparent coating is not particularly limited, and any of dry thin film forming techniques such as vacuum evaporation, sputtering and ion plating techniques and wet thin film forming techniques such as dipping, spinner, spray, roll coater and flexographic printing techniques as mentioned above can be employed depending on the type of material of the transparent coating.

When the above transparent coating is formed by a wet thin film forming technique, conventional coating liquids for forming transparent coating can be used. Examples of such conventional coating liquids for forming transparent coating include those containing any of inorganic oxides such as silica, titania and zirconia or a compound oxide thereof as a component for forming transparent coating.

In the present invention, a silica based coating liquid for forming transparent coating containing any of hydrolytic polycondensates from hydrolyzable organosilicon compounds and silicic acid polycondensates obtained by dealkalizing aqueous solutions of alkali metal silicates is preferably used as the above coating liquid for forming transparent coating.

Especially, it is preferred that a hydrolytic polycondensate of an alkoxysilane represented by the following general formula [1] be contained therein. The silica based coating film formed from this coating liquid has a refractive index lower than that of the conductive fine particle layer containing fine composite metal particles, and the obtained transparent coating film bearing substrate is excellent in anti-reflection properties.

$$R_aSi(OR')_{4-a} \quad [1]$$

wherein R represents a vinyl group, an aryl group, an acryl group, an alkyl group having 1 to 8 carbon atoms, a hydrogen atom or a halogen atom; R' represents a vinyl group, an aryl group, an acryl group, an alkyl group having 1 to 8 carbon atoms, $—C_2H_4OC_nH_{2n+1}$ in which n is an integer of 1 to 4 or a hydrogen atom; and a is an integer of 1 to 3.

Examples of these alkoxysilanes represented by the above formula include tetramethoxysilane, tetraethoxysilane, tetraisopropoxysilane, tetrabutoxysilane, tetraoctylsilane, methyltrimethoxysilane, methyltriethoxysilane, ethyltriethoxysilane, methyltriisopropoxysilane, inyltrimethoxysilane, phenyltrimethoxysilane and imethyldimethoxysilane.

A coating liquid for forming transparent coating containing hydrolytic polycondensates of an alkoxysilane can be obtained by hydrolyzing at least one alkoxysilane as mentioned above in the presence of an acid catalyst in, for example, a mixed solvent of water and an alcohol. The concentration of coating forming components in this coating liquid preferably ranges from 0.5 to 2.0% by weight in terms of oxide. In the coating liquid for forming transparent coating for use in the present invention, the same deionization as in the coating liquid for forming transparent conductive coating may be performed to thereby reduce the ion concentration of the coating liquid for forming transparent coating to the same level of concentration as in the coating liquid for forming transparent conductive coating.

Moreover, the coating liquid for forming transparent coating for use in the present invention may be doped with, for example, fine particles of a material of low refractive index such as magnesium fluoride, conductive fine particles whose amount is as small as not detrimental to the transparency and anti-reflection performance of the transparent coating film and/or a dye or pigment.

In the present invention, during the drying step or after the drying step, the coating film formed by applying the above coating liquid for forming transparent coating may be heated at 150° C. or higher. In the alternative, the uncured coating may be irradiated with an electromagnetic wave, such as ultraviolet radiation, electron beams, X-rays and gamma-rays, having a wavelength smaller than that of visible radiation, or may be exposed to an atmosphere of active gas such as ammonia. This treatment promotes the curing of coating forming components and increases the hardness of obtained transparent coating.

An antiglare substrate with transparent conductive coating with lowered glaringness which has ring-like protrusions and recesses on a surface of the transparent coating can be obtained by applying the coating liquid for forming transparent coating onto the transparent conductive fine particle layer while keeping the transparent conductive fine particle layer at about 40–90° C. and then performing the above treatments at the stage of the application of the coating liquid for forming transparent coating for forming the coating.

Second Process for Producing Substrate with Transparent Conductive Coating

The second process for Producing a substrate with transparent conductive coating according to the present invention comprises the steps of: applying onto a substrate a coating liquid for forming a transparent conductive coating, comprising fine metal particles or fine alloy particles having an average particle size of 1 to 200 nm and a polar solvent, drying to thereby form a transparent conductive fine particle layer, and applying a coating liquid for forming a transparent coating, the above coating liquid containing ions of a metal having a standard hydrogen electrode potential higher than that of the metal or alloy which constitutes the fine metal particles or the fine alloy particles, onto the transparent conductive fine particle layer to thereby not only form a transparent coating having a refractive index lower than that of the fine particle layer on the fine particle layer but also cause the metal having a standard hydrogen electrode potential higher than that of the metal or alloy which constitutes the fine metal particles or the fine alloy particles to precipitate on the fine metal particles or the fine alloy particles contained in the fine particle layer so that the fine metal particles or the fine alloy particles are converted to fine composite metal particles.

[Formation of Transparent Conductive Fine Particle Layer]

In the second process of the present invention, first, the coating liquid for forming transparent conductive coating is applied onto the substrate and dried, thereby forming the transparent conductive fine particle layer.

The coating liquid for forming transparent conductive coating for use in the second process of the present invention comprises fine metal particles or fine alloy particles and a polar solvent.

The same fine metal particles and fine alloy particles as mentioned hereinbefore can be used and such fine metal particles can be used in combination with such fine alloy particles in this process of the present invention.

The above fine metal particles and/or fine alloy particles are preferably contained in the coating liquid for transparent conductive coating film formation in an amount of 0.05 to 5% by weight, still preferably, 0.1 to 2% by weight. moreover, the coating liquid for forming transparent conductive coating may be doped with the above conductive fine particles other than fine metal particles and fine alloy particles, dye, pigment and other additives according to necessity.

The solid content of the coating liquid for forming transparent conductive coating for use in the present invention is preferably not greater than 15% by weight as mentioned hereinbefore.

The above coating liquid for forming transparent conductive coating may further contain a matrix component which acts as a binder after the formation of the coating, and the same matrix components as mentioned hereinbefore can be used in this process.

Still further, this coating liquid for forming transparent conductive coating may be doped with an organic stabilizer. Suitable type and amount of organic stabilizer are as mentioned hereinbefore.

In this process of the present invention, the coating liquid for forming transparent conductive coating is applied onto the substrate and dried, thereby forming the transparent conductive fine particle layer on a surface of the substrate, in the same manner as mentioned hereinbefore.

[Formation of Transparent Coating]

In the second process of the present invention, subsequently, a coating liquid for forming a transparent coating, which contains ions of a metal having a standard hydrogen electrode potential higher than that of the metal or alloy which constitutes the fine metal particles or the fine alloy particles, is applied onto the thus formed transparent conductive fine particle layer to thereby not only form a transparent coating having a refractive index lower than that of the fine particle layer on the fine particle layer but also cause the metal having a standard hydrogen electrode potential higher than that of the metal or alloy which constitutes the fine metal particles or the fine alloy particles to precipitate on the fine metal particles or the fine alloy particles contained in the fine particle layer so that the fine metal particles or the fine alloy particles are converted to fine composite metal particles.

The coating liquid for forming transparent coating for use in the present invention contains the above transparent coating forming components and metal ions having a standard hydrogen electrode potential higher than those of the fine metal or alloy particles constituting components. It is preferred that the metal ions having higher standard hydrogen electrode potential be added to the coating liquid in an amount of 0.05 to 19 parts by weight, especially, 0.1 to 9 parts by weight per part by weight of fine metal or alloy particles contained in the formed transparent conductive fine particle layer. The metal ions having higher standard hydrogen electrode potential precipitate on he fine metal particles or the fine alloy particles contained in the transparent conductive fine particle layer to thereby form fine composite metal particles.

When the transparent conductive fine particle layer contains an organic stabilizer, the coating liquid for forming transparent coating may contain an acid for decomposing and removing the organic stabilizer. The same acids as mentioned hereinbefore can be used in this coating liquid.

Moreover, the coating liquid for forming transparent coating for use in the present invention may be doped with, for example, fine particles of a material of low refractive index such as magnesium fluoride, conductive fine particles whose amount is as small as not detrimental to the transparency and anti-reflection performance of the transparent coating film and/or a dye or pigment.

In the present invention, during the drying step or after the drying step, the transparent coating film formed by applying the above coating liquid for forming transparent coating may be heated at 150° C. or higher. In the alternative, the uncured coating may be irradiated with an electromagnetic wave, such as ultraviolet radiation, electron beams, X-rays and gamma-rays, having a wavelength smaller than that of visible radiation, or may be exposed to an atmosphere of active gas capable of expediting the curing of coating forming components, such as ammonia. This treatment promotes the curing of coating film forming components and increases the hardness of obtained transparent coating.

An antiglare substrate with transparent conductive coating with lowered glaringness which has ring-like protrusions and recesses on a surface of the transparent coating can be obtained by applying the coating liquid for forming transparent coating onto the transparent conductive fine particle layer while keeping the transparent conductive fine particle layer at about 40–90° C. and then performing the above treatments at the stage of the application of the coating liquid for forming transparent coating for forming the coating.

Third Process for Producing Substrate with Transparent Conductive Coating

The third process for producing a substrate with transparent conductive coating according to the present invention comprises the steps of:

- applying onto a substrate a coating liquid for forming a transparent conductive coating, comprising fine metal particles, a polar solvent and an organic stabilizer,
- drying to thereby form a transparent conductive fine particle layer,
- applying a coating liquid for forming a transparent coating containing an acid, onto the transparent conductive fine particle layer to thereby form a transparent coating having a refractive index lower than that of the fine particle layer on the fine particle layer,
- decomposing the organic stabilizer, and
- heating.

The same fine metal particles, polar solvent and organic stabilizer as mentioned hereinbefore can be used in this process.

According to necessity, the coating liquid for forming transparent conductive coating for use in this process of the present invention may further comprise conductive fine particles other than the fine metal particles, additives such as a dye and a pigment and a matrix component, which may be selected from among those mentioned hereinbefore.

In this process of the present invention, the above coating liquid for forming transparent conductive coating is applied onto the substrate and dried, thereby forming the transparent conductive fine particle layer on a surface of the substrate, in the same manner as mentioned hereinbefore.

The coating liquid for forming transparent coating which contains the above acid is applied onto the thus formed transparent conductive fine particle layer, thereby forming the transparent coating having a refractive index lower than that of the transparent conductive fine particle layer on the transparent conductive fine particle layer and decomposing the organic stabilizer.

Moreover, the coating liquid for forming transparent coating for use in the present invention may be doped with, for example, fine particles of a material of low refractive index such as magnesium fluoride, conductive fine particles whose amount is as small as not detrimental to the transparency and anti-reflection performance of the transparent coating film and/or a dye or pigment.

In the present invention, during the drying step or after the drying step, the transparent coating film formed by applying the above coating liquid for forming transparent coating may be heated at 150° C. or higher. In the alternative, the uncured coating may be irradiated with an electromagnetic wave, such as ultraviolet radiation, electron beams, X-rays and gamma-rays, having a wavelength smaller than that of visible radiation, or may be exposed to an atmosphere of active gas capable of expediting the curing of coating forming components, such as ammonia. This treatment promotes the curing of coating film forming components and increases the hardness of obtained transparent coating.

An antiglare substrate with transparent conductive coating with lowered glaringness which has ring-like protrusions and recesses on a surface of the transparent coating can be obtained by applying the coating liquid for forming transparent coating onto the transparent conductive fine particle layer while keeping the transparent conductive fine particle layer at about 40–90° C. and then performing the above treatments at the stage of the application of the coating liquid for forming transparent coating for forming the coating.

Display Device

The substrate with transparent conductive coating of the present invention has a surface resistivity of $10^2$ to $10^4$ Ω/□. which is required for electromagnetic shielding and exhibits satisfactory anti-reflection performance in the visible radiation and near infrared regions. This substrate with transparent conductive coating is suitably used as a front panel of a display device.

The display device of the present invention is a device capable of electrically displaying images such as a cathode ray tube (CRT), a fluorescent character display tube (FIP), a plasma display (PDP) or a liquid crystal display (LCD) and is provided with a front panel composed of the above substrate with transparent conductive coating.

When display devices provided with conventional front panels are operated, the display of images on the front panel is accompanied by emission of electromagnetic waves from the front panel, which electromagnetic waves are detrimental to the health of the observer. By contrast, the display device of the present invention has its front panel composed of the substrate with transparent conductive coating which has a surface resistivity of $10^2$ to $10^4$ Ω/□, so that the above electromagnetic waves and electromagnetic field induced by the emission of electromagnetic waves can effectively be shielded.

When a light reflection occurs on the front panel of the display device, the reflected light causes it to the difficult to see displayed images. However, in the display device of the present invention, the front panel is composed of the substrate with transparent conductive coating which exhibits satisfactory anti-reflection performance in the visible radiation and near infrared regions, so that the above light reflection can effectively be prevented.

Moreover, when the front panel of the cathode ray tube is composed of the substrate with transparent conductive coating of the present invention and when a small amount of dye or pigment is contained in at least one of the transparent conductive fine particle layer and the transparent coating formed thereon of the transparent conductive coating, the dye or pigment absorbs a ray of its intrinsic wavelength, thereby enabling the contrast of images displayed on the cathode ray tube.

EFFECT OF THE INVENTION

The present invention enables obtaining a coating liquid for forming transparent conductive coating, from which a transparent conductive coating being excellent in conductivity and electromagnetic shielding properties, enabling control of light transmittance and ensuring high reliability can be formed.

Further, the present invention enables obtaining a substrate with transparent conductive coating in which the transparent conductive coating having excellent conductivity and electromagnetic shielding properties, enables control of light transmittance and ensures high reliability.

The use of the above substrate with transparent conductive coating as a front panel of a display device enables obtaining a display device which is excellent in not only electromagnetic shielding properties but also anti-reflection properties.

The process for producing a substrate with transparent conductive coating according to the present invention enables providing a substrate with transparent conductive coating which, because of the formation of a transparent conductive fine particle layer comprising fine particles of a composite metal as a conductive substance, has excellent conductivity and electromagnetic shielding properties, minimizes lowering of light transmittance or the like and ensures high reliability.

Moreover, the process for producing a substrate with transparent conductive coating according to the present invention does not need the heating of a coated substrate at temperatures as high as at least 400° C. for removing an organic stabilizer as performed in the prior art because, in the present invention, the organic stabilizer is decomposed and removed by the acid contained in the coating liquid for forming transparent coating. Therefore, not only can the aggregation and fusion of composite metal particles at high-temperature heating be prevented but also the deterioration of haze of obtained coating can be prevented.

The avoidance of high-temperature treatment also enables forming a transparent conductive coating on a front panel of a display device such as CRT.

EXAMPLE

The present invention will now be illustrated with reference to the following Examples, which in no way limit the scope of the invention.

Productive Example (a) Preparation of Dispersion of Conductive Fine Particles:

The compositions of dispersions of fine metal particles, fine alloy particles, fine composite metal particles and conductive fine particles other than the fine metal particles, fine alloy particles and fine composite metal particles employed in the Inventive and Comparative Examples are listed in Table 1.

(1) Dispersions of fine alloy particles (P-1, P-2, P-4, P-6) and fine metal particles (P-7, P-10) were prepared by the following procedure.

Polyvinyl alcohol (polyvinylpyrrolidone for fine alloy particles P-2) was added to a mixed solvent of methanol and water (40 parts by weight/60 parts by weight) in an amount of 0.01 part by weight per part by weight of metal or alloy metal to be added. Thereafter, at least one compound selected from among chloroauric acid, palladium nitrate, copper nitrate, rhodium nitrate and chloroplatinic acid was added so that the content of fine metal particles or fine alloy metal particles in the dispersion was 2% by weight in terms of metal and so that, in the formation of fine alloy metal particles, the metal species had weight proportions specified in Table 1. The mixture was heated at 90° C. for 5 hr in an atmosphere of nitrogen in a flask equipped with reflux means. Thus, dispersions of fine metal particles and fine alloy metal particles were obtained.

Upon the completion of the 5 hr heating, the reflux was discontinued and methanol was removed by heating. Water was added to thereby obtain dispersions of solid contents specified in Table 1.

(2) Dispersion of fine alloy particles (P-3) was prepared by the following procedure.

Trisodium citrate was added to 100 g of pure water in an amount of 0.01 part by weight per part by weight of alloy metal to be added. An aqueous solution of silver nitrate and palladium nitrate was added thereto so that the content in terms of metal was 10% by weight and so that the metal species of the alloy metal had weight proportions specified in Table 1. Further, an aqueous solution of ferrous sulfate was added in a molar amount equal to the total mole of silver nitrate and palladium nitrate and agitated for 1 hr in an atmosphere of nitrogen, thereby obtaining a dispersion of fine alloy particles. The resultant dispersion was washed with water by the use of a centrifugal separator to thereby remove impurities and dispersed in water. Thus, dispersion of solid content specified in Table 1 was obtained.

(3) Dispersion of fine composite metal particles (P-5) was prepared by the following procedure.

Polyvinyl alcohol was added to the above prepared dispersion of fine alloy particles (P-4) in an amount of 0.01 part by weight per part by weight of Pd metal to be added. An aqueous solution of palladium nitrate was added thereto so that the weight ratio of fine alloy particles (P-4) to Pd metal was 70:30. The mixture was heated at 90° C. for 5 hr in an atmosphere of nitrogen in a flask equipped with reflux means. Upon the completion of the 5 hr heating, the reflux was discontinued and methanol was removed by heating. Water was added to thereby obtain dispersion of solid content specified in Table 1. The thus obtained fine composite metal particles (P-5) comprised fine alloy particles (P-4) having a composite metal layer composed mainly of Pd as a particulate surface layer.

(4) Dispersion of fine composite metal particles (P-8) was prepared by the following procedure.

Polyvinyl alcohol was added to the above prepared dispersion of fine metal particles (P-7) in an amount of 0.01 part by weight per part by weight of Pd metal to be added. An aqueous solution of palladium nitrate was added thereto so that the weight ratio of fine metal particles (P-7) to Pd metal was 70:30. The mixture was heated at 90° C. for 5 hr in an atmosphere of nitrogen in a flask equipped with reflux means. Upon the completion of the 5 hr heating, the reflux was discontinued and methanol was removed by heating. Water was added to thereby obtain dispersion of solid content specified in Table 1. The thus obtained fine composite metal particles (P-8) comprised fine metal particles (P-7) having a composite metal layer composed mainly of Pd as a particulate surface layer.

(5) Dispersion of fine composite metal particles (P-9) was prepared by the following procedure.

Polyvinyl alcohol was added to the above prepared dispersion of fine metal particles (P-7) in an amount of 0.01 part by weight per part by weight of Pd metal to be added. An aqueous solution of palladium nitrate was added thereto so that the weight ratio of fine metal particles (P-7) to Pd metal was 70:30. Thereafter, an aqueous solution of ferrous sulfate was added over a period of 5 min in a molar amount equal to the number of moles of palladium nitrate. The mixture was agitated for 1 hr in an atmosphere of nitrogen to thereby obtain a dispersion of fine composite metal particles (P-9). Water was added to thereby obtain dispersion of solid content specified in Table 1. The thus obtained fine composite metal particles (P-9) comprised fine metal particles (P-7) having a composite metal layer composed mainly of Pd as a particulate surface layer.

(6) Fine particles of Sb-doped tin oxide (P-11) were prepared by the following procedure.

57.7 g of tin chloride and 7.0 g of antimony chloride were dissolved in 100 g of methanol to thereby obtain a solution. The obtained solution was added to 1000 g of pure water under agitation at 90° C. over a period of 4 hr to thereby effect a hydrolysis. The resultant precipitate was recovered by filtration, washed and heated at 500° C. in dry air for 2 hr, thereby obtaining powder of antimony-doped conductive tin oxide. 30 g of this powder was added to 70 g of an aqueous solution of potassium hydroxide (containing 3.0 g of KOH), and the mixture was milled by means of a sand mill for 3 hr while maintaining the temperature at 30° C. to thereby obtain a sol. This sol was dealkalized with the use of an ion exchange resin, and water was added to thereby obtain dispersion of fine Sb-doped tin oxide particles (P-11) having a solid content specified in Table 1.

(7) Fine particles of Sn-doped indium oxide (P-12) were prepared by the following procedure.

79.9 g of indium nitrate was dissolved in 686 g of water to thereby obtain a solution. 12.7 g of potassium stannate was dissolved in a 10% by weight aqueous potassium hydroxide solution to thereby obtain a solution. These solutions were added to 1000 g of pure water held at 50° C. over a period of 2 hr. During this period, the pH value of the system was maintained at 11. Thus, there was obtained a dispersion of Sn-doped indium oxide hydrate. An Sn-doped indium oxide hydrate was recovered therefrom by filtration, washed, dried, heated at 350° C. in air for 3 hr and heated at 600° C. in air for 2 hr. Thus, fine particles of Sn-doped indium oxide were obtained. The particles were dispersed in pure water so that the solid content was 30% by weight and the pH value of the dispersion was adjusted to 3.5 with an aqueous nitric acid solution. The resultant mixture was milled by means of a sand mill for 3 br while maintaining the temperature thereof at 30° C. to thereby obtain a sol. This sol was treated with an ion exchange resin to thereby remove nitrate ions. Pure water was added to thereby obtain dispersion of fine particles of Sn-doped indium oxide (P-13) having a solid content specified in Table 1.

(8) Ethanol dispersion of fine particles of conductive carbon (P-13: produced by Tokai Carbon Co., Ltd.) having a solid content of 20% by weight (P-13) was used as a colorant.

(b) Preparation of Matrix Forming Component Solution (M):

A mixed solution consisting of 50 g of ethyl orthosilicate ($SiO_2$: 28% by weight), 194.6 g of ethanol, 1.4 g of concentrated nitric acid and 34 g of pure water was agitated at room temperature for 5 hr to thereby obtain a matrix forming component containing solution of 5% by weight in $SiO_2$ concentration (M).

(c) Preparation of Coating Liquid for Forming Transparent Conductive Coating:

Coating liquids for transparent conductive coating film formation (C-1) to (C-15) listed in Table 2 were prepared from the dispersions (P-1) to (P-13) listed in Table 1, the above matrix forming component containing solution (M), water, t-butanol, butyl cellosolve, citric acid and N- methyl-2-pyrrolidone.

(d) Preparation of Coating Liquid for Forming Transparent Coating (B):

(1) Coating Liquid for Forming Transparent Coating (B-1):

Coating liquid for forming transparent coating (B-1) of 1% by weight in $SiO_2$ concentration was prepared by adding a mixed solvent consisting of ethanol, butanol, diacetone alcohol and isopropanol (mixing ratio: 2/1/1/5 on weight basis) to the above matrix forming component containing solution (M).

(2) Coating Liquid for Forming Transparent Coating (B-2):

17.9 g of ethyl orthosilicate ($SiO_2$: 28% by weight), 65.5 g of ethanol, 4.7 g of concentrated hydrochloric acid and 11.9 g of pure water were mixed together, agitated at 50° C. for 24 hr and aged to thereby obtain mixed solution (1).

75.9 g of ethanol, 4.1 g of concentrated hydrochloric acid and 10.1 g of pure water were mixed together, and 9.8 g of methyl orthosilicate ($SiO_2$: 51% by weight) was added thereto. The mixture was agitated at 50° C. for 24 hr and aged to thereby obtain mixed solution (2).

100 parts by weight of the above mixed solution (1) and 50 parts by weight of the above mixed solution (2) were mixed together ($SiO_2$ concentration: 5% by weight), and a mixed solvent consisting of isoproparol, propylene glycol monomethyl ether and diacetone alcohol (mixing ratio: 6/3/1 on weight basis) was added thereto, thereby obtaining coating liquid for forming transparent coating of 1% by weight in $SiO_2$ concentration (B-2).

With respect to the coating liquid for forming transparent conductive coating and coating liquid for forming transparent coating for use in this invention, deionization was conducted with the use of amphoteric ion exchange resin (Diaion SMNUPB produced by Mitsubishi Chemical Industries, Ltd.) to thereby regulate the ion concentration of each of the coating liquids.

For each of the coating liquids, the alkali metal ion concentration and alkaline earth metal ion concentration were measured by the atomic absorption analysis, the other metal ion concentrations by the emission spectrochemical analysis and the ammonium ion and anion concentrations by the ion chromatography.

TABLE 1

| | Fine particles | | Stabilizer (per wt.pt. of particles) | | Av. particle | Solid | |
|---|---|---|---|---|---|---|---|
| Disper-sion | type | wt. ratio | type | amt. (wt.pt.) | size (nm) | cont. (%) | Solvent |
| P-1 | Au—Pd | 50:50 | polyvinyl alcohol | 0.01 | 10 | 2.0 | water |
| P-2 | Ag—Pd | 70:30 | Polyvinyl pyrroli-done | 0.01 | 5 | 1.0 | Water |
| P-3 | Ag—Pd | 70:30 | trisodium citrate | 0.01 | 8 | 2.0 | Water |
| P-4 | Ag—Cu | 90:10 | polyvinyl alcohol | 0.01 | 20 | 2.0 | Water |
| P-5 | Ag—Cu—Pd | 63:7:30 | polyvinyl alcohol | 0.01 | 22 | 2.0 | Water |
| P-6 | Pt—Rh | 95:5 | polyvinyl alcohol | 0.01 | 10 | 1.0 | Water |
| P-7 | Ag | | polyvinyl alcohol | 0.01 | 30 | 3.0 | Water |
| P-8 | Ag—Pd | 70:30 | polyvinyl alcohol | 0.01 | 34 | 3.0 | Water |
| P-9 | Ag—Pd | 70:30 | polyvinyl alcohol | 0.01 | 34 | 3.0 | Water |
| P-10 | Au | | polyvinyl alcohol | 0.01 | 20 | 1.0 | Water |
| P-11 | Sb—$SnO_2$ | | | | 10 | 20 | Water |
| P-12 | Sn—$In_2O_3$ | | | | 70 | 20 | Water |
| P-13 | conduc-tive carbon | | | | 100 | 20 | ethanol |
| matrix | $SiO_2$ | | | | | 5.0 | Water |

TABLE 2

| Coating | Fine particle dispersion | | Dispersion med. | | Org. Stabilizer | | Solid cont. | Ion conc. |
|---|---|---|---|---|---|---|---|---|
| fl. | type | wt.pts. | type | wt.pts. | type | wt.pts. | wt % | mmol/100 g |
| C-1 | P-1 | 100 | water | 220 | | | 0.5 | 0.1 |
| | | | butyl cellosolve | 80 | | | | |
| C-2 | P-2 | 100 | water | 100 | | | 0.4 | 0.2 |
| | | | t-butanol | 50 | | | | |
| C-3 | P-3 | 50 | water | 100 | | | 0.5 | 0.1 |
| | | | t-butanol | 50 | | | | |
| C-5 | P-5 | 100 | water | 200 | citric acid | 0.4 | 0.5 | 0.3 |
| | | | butyl cellosolve | 100 | | | | |
| C-6 | P-5 | 100 | water | 294 | citric acid | 0.4 | 0.5 | 0.3 |
| | P-13 | 1.3 | butyl | | | | | |
| | matrix | 5 | cellosolve | 100 | | | | |
| C-7 | P-5 | 100 | water | 450 | citric acid | 0.4 | 0.5 | 0.3 |
| | P-11 | 1.5 | butyl | | | | | |
| | P-12 | 3 | cellosolve | 100 | | | | |
| | P-13 | 1 | | | | | | |
| | matrix | 4 | | | | | | |
| C-8 | P-6 | 10 | water | 10 | | | 0.4 | 0.3 |
| | | | butyl cellosolve | 5 | | | | |
| C-9 | P-6 | 100 | water | 17.5 | | | 1.0 | 1.1 |
| | P-12 | 2.5 | butyl cellosolve | 30 | | | | |
| C-10 | P-1 | 100 | water | 348 | | | 0.4 | 1.5 |
| | matrix | 4 | butyl cellosolve | 88 | | | | |
| C-11 | P-7 | 233 | water | 587 | N-methyl-2-pyrrolidone | 20 | 0.7 | 0.1 |
| | | | butyl cellosolve | 160 | | | | |
| C-12 | P-8 | 233 | water | 587 | N-methyl-2-pyrrolidone | 20 | 0.7 | 0.2 |
| | | | butyl cellosolve | 160 | | | | |
| C-13 | P-9 | 233 | water | 587 | N-methyl-2-pyrrolidone | 20 | 0.7 | 0.5 |
| | | | butyl cellosolve | 160 | | | | |
| C-14 | P-10 | 300 | water | 485 | N-methyl-2-pyrrolidone | 20 | 1.0 | 0.1 |
| | P-12 | 31.5 | butyl | | | | | |
| | P-13 | 3.5 | cellosolve | 160 | | | | |
| C-15 | P-11 | 18 | water | 246 | | | 1.2 | 0.2 |
| | P-12 | 36 | methanol | 694 | | | | |
| | p-13 | 6 | | | | | | |

Examples 1 to 9 and Comparative Examples 1 and 2

Production of Panel Glass with Transparent Conductive Coating:

A surface of a panel glass (14 inch) for cathode ray tube with its temperature held at 40° C. was coated with each of the above coating liquids for forming transparent conductive coating (C-1) to (C-10), (C-14) and (C-15) by the spinner technique conducted at 100 rpm for 90 sec and dried.

The thus formed transparent conductive fine particle layer was coated with the coating liquid for forming transparent coating (B-1) by the same spinner technique conducted at 100 rpm for 90 sec. dried and heated under conditions specified in Table 3, thereby obtaining substrate with transparent conductive coatings.

With respect to each of these substrate with transparent conductive coatings, the surface resistivity was measured by the use of a surface resistivity meter (LORESTA manufactured by Mitsubishi Petrochemical Co., Ltd.) and the haze by the use of a haze computer (3000A manufactured by Nippon Denshoku Co., Ltd.). The reflectance thereof was measured by the use of a reflectometer (MCPD-2000 manufactured by Otsuka Electronic Co., Ltd.) and the indicated reflectance is one measured at a wavelength exhibiting the lowest reflectance within the wavelength range of 400 to 700 nm. The particle size of the fine particles was measured by the use of a microtrack particle size analyzer (manufactured by Nikkiso Co., Ltd.).

The reliability evaluation was made on the basis of the saline resistance and oxidation resistance tests performed by the following methods.

Saline Resistance

A piece of each of the substrate with transparent conductive coatings obtained in the above Examples and Comparative Examples was partially immersed in a 5% by weight aqueous saline solution, allowed to stand still for 24 hr or 48 hr and taken out. Any color tone change was observed between the immersed part and the nonimmersed part of the piece.

Oxidation Resistance

A piece of each of the substrate with transparent conductive coatings obtained in the above Examples and Comparative Examples was partially immersed in a 2% by weight aqueous hydrogen peroxide solution, allowed to stand still for 24 hr and taken out. Any color tone change was observed between the immersed part and the nonimmersed part of the piece.

Evaluation Criteria

○: no change observed,

Δ: slight change observed, and x: clear change observed.

Examples 10 and 11 and Comparative Example 3

Production of Transparent Conductive Coating Film Bearing Panel Glass:

Substrate with transparent conductive coatings were produced and evaluated in the same manner as in Examples 1 to 9 and Comparative Examples 1 and 2, except that a surface of a panel glass (14 inch) for cathode ray tube with its temperature held at 45° C. was coated with each of the above coating liquids for forming transparent conductive coating (C-11) to (C-13) by the spinner technique conducted at 150 rpm for 90 sec and dried.

The results are given in Table 3.

TABLE 3

(I)

| | Coating liquid for forming fine particle layer | Coating liquid for forming transparent coating | Coating film forming condition |
|---|---|---|---|
| Ex.1 | C-1 | B-1 | 160° C. × 30 min |
| Ex.2 | C-2 | B-1 | 160° C. × 30 min |
| Ex.3 | C-3 | B-1 | 160° C. × 30 min |
| Ex.4 | C-5 | B-1 | 160° C. × 30 min |
| Ex.5 | C-6 | B-1 | 160° C. × 30 min |
| Ex.6 | C-7 | B-1 | 160° C. × 30 min |
| Ex.7 | C-8 | B-1 | 160° C. × 30 min |
| Ex.8 | C-9 | B-1 | 160° C. × 30 min |
| Ex.9 | C-10 | B-1 | 160° C. × 30 min |
| Comp. Ex.1 | C-14 | B-1 | 160° C. × 30 min |
| Comp. Ex.2 | C-15 | B-1 | 200° C. × 30 min |
| Ex.10 | C-12 | B-2 | 180° C. × 45 min |
| Ex.11 | C-13 | B-2 | 180° C. × 45 min |
| Comp. Ex.3 | C-11 | B-2 | 180° C. × 45 min |

TABLE 3

(II)

| | Substrate with transparent conductive coating | | | | | |
|---|---|---|---|---|---|---|
| | Surface resistivity | Reflectance | Haze | Reliability | | |
| | | | | Saline resistance | | Oxidation resistance |
| | (Ω/□) | (%) | (%) | 24 hrs. | 48 hrs. | |
| Ex.1 | 1 × $10^3$ | 0.2 | 0.4 | ○ | ○ | ○ |
| Ex.2 | 2 × $10^2$ | 0.1 | 0.9 | ○ | Δ | Δ |
| Ex.3 | 5 × $10^2$ | 0.1 | 0.3 | ○ | Δ | Δ |
| Ex.4 | 1 × $10^3$ | 0.2 | 0.6 | ○ | ○ | ○ |
| Ex.5 | 7 × $10^3$ | 0.4 | 0.5 | ○ | ○ | ○ |
| Ex.6 | 6 × $10^3$ | 0.5 | 0.4 | ○ | Δ | Δ |
| Ex.7 | 3 × $10^2$ | 0.1 | 0.3 | ○ | ○ | ○ |
| Ex.8 | 5 × $10^3$ | 0.8 | 0.9 | ○ | ○ | ○ |
| Ex.9 | 3 × $10^3$ | 0.5 | 0.5 | ○ | ○ | ○ |
| Comp. Ex.1 | 9 × $10^4$ | 0.4 | 1.9 | ○ | ○ | ○ |
| Comp. Ex.2 | 2 × $10^5$ | 0.6 | 0.8 | ○ | ○ | ○ |
| Ex.10 | 5 × $10^2$ | 0.2 | 0.3 | ○ | ○ | ○ |
| Ex.11 | 4 × $10^2$ | 0.2 | 0.3 | ○ | ○ | ○ |
| Comp. Ex.3 | 5 × $10^2$ | 0.8 | 0.5 | X | X | X |

What is claimed is:

1. A substrate with transparent conductive coating comprising:

a substrate.

a transparent conductive fine particle layer including fine particles of a composite metal having an average particle size of 1 to 200 nm, said layer being disposed on the substrate, and a transparent coating formed on the transparent conductive fine particle layer and having a refractive index lower than that of the transparent conductive fine particle layer wherein said fine particles of a composite metal are fine metal particles or fine alloy particles covered by a metal having a standard hydrogen electrode potential higher than that of the metal or alloy metal which constitutes the fine particles.

2. The substrate with transparent conductive coating as claimed in claim 1, wherein the composite metal particles are composed of an alloy of a plurality of metals.

3. The substrate with transparent conductive coating as claimed in claim 2, wherein the fine particle layer further comprises conductive fine particles other than the composite metal particles.

4. The substrate with transparent conductive coating as claimed in claim 2, wherein the fine particle layer further comprises a matrix.

5. A display device comprising a front panel composed of the substrate with transparent conductive coating of claim 2, the transparent conductive coating being formed at an outer surface of the front panel.

6. The substrate with transparent conductive coating as claimed in claim 1, wherein the fine particle layer further comprises conductive fine particles other than the composite metal particles.

7. A display device comprising a front panel composed of the substrate with transparent conductive coating of claim 6, the transparent conductive coating being formed at an outer surface of the front panel.

8. The substrate with transparent conductive coating as claimed in claim 1, wherein the fine particle layer further comprises a matrix.

9. A display device comprising a front panel composed of the substrate with transparent conductive coating of claim 8, the transparent conductive coating being formed at an outer surface of the front panel.

10. The substrate with transparent conductive coating as claimed in claim 8, wherein the matrix is composed of silica.

11. A display device comprising a front panel composed of the substrate with transparent conductive coating of claim 10, the transparent conductive coating being formed at an outer surface of the front panel.

12. A display device comprising a front panel composed of the substrate with transparent conductive coating of claim 1, the transparent conductive coating being formed at an outer surface of the front panel.

* * * * *

UNITED STATES PATENT AND TRADEMARK OFFICE
CERTIFICATE OF CORRECTION

PATENT NO. : 6,180,030 B1
DATED : January 30, 2001
INVENTOR(S) : Toshiharu Hirai et al.

It is certified that error appears in the above-identified patent and that said Letters Patent is hereby corrected as shown below:

Column 1,
Line 49, after "Ω/□" insert period (.).

Column 7
Line 46, "Producina" should read -- Producing --.

Column 8,
Line 43, "cid salt" should read -- acid salt --.

Column 9,
Line 4, "till preferably" should read -- still preferably --.
Line 56, "resent" should read -- present --.

Column 11,
Line 60, "inyl" should read -- vinyl --.

Column 12,
Line 39, "for Producing" should read -- for producing --.

Column 13,
Line 13, "moreover" should begin a new paragraph and read -- Moreover--.
Line 64, "on he" should read -- on the --.

Column 16,
Line 8, after "enabling" insert -- the improvement of --.

Column 18,
Line 52, "3 br" should read -- 3 hr --.

UNITED STATES PATENT AND TRADEMARK OFFICE
CERTIFICATE OF CORRECTION

PATENT NO. : 6,180,030 B1
DATED : January 30, 2001
INVENTOR(S) : Toshiharu Hirai et al.

It is certified that error appears in the above-identified patent and that said Letters Patent is hereby corrected as shown below:

Column 24, claim 1,
Line 6, "substrate." should read -- substrate, --.
Line 15, after "particle layer" insert comma (,).

Signed and Sealed this

Eleventh Day of September, 2001

*Attest:*

NICHOLAS P. GODICI

*Attesting Officer*

*Acting Director of the United States Patent and Trademark Office*